(12) United States Patent
Liu et al.

(10) Patent No.: US 12,448,015 B2
(45) Date of Patent: Oct. 21, 2025

(54) INFORMATION SECURITY PROTECTION METHOD AND APPARATUS

(71) Applicant: ZHUZHOU CRRC TIMES ELECTRIC CO., LTD., Hunan (CN)

(72) Inventors: Kean Liu, Hunan (CN); Jing Shang, Hunan (CN); Shaolong Xu, Hunan (CN); Jun Tang, Hunan (CN); Yu Wang, Hunan (CN); Jun Yang, Hunan (CN); Yan Xiong, Hunan (CN); Guotao Jiang, Hunan (CN); Fan Jiang, Hunan (CN); Qing Xu, Hunan (CN); Siyuan Li, Hunan (CN); Qinyang Luo, Hunan (CN)

(73) Assignee: ZHUZHOU CRRC TIMES ELECTRIC CO., LTD., Hunan (CN)

( * ) Notice: Subject to any disclaimer, the term of this patent is extended or adjusted under 35 U.S.C. 154(b) by 354 days.

(21) Appl. No.: 18/000,639

(22) PCT Filed: Sep. 29, 2020

(86) PCT No.: PCT/CN2020/118624
§ 371 (c)(1),
(2) Date: Dec. 2, 2022

(87) PCT Pub. No.: WO2021/243900
PCT Pub. Date: Dec. 9, 2021

(65) Prior Publication Data
US 2023/0216867 A1      Jul. 6, 2023

(30) Foreign Application Priority Data

Jun. 4, 2020   (CN) .......................... 202010500690.2

(51) Int. Cl.
*B61L 15/00*    (2006.01)
*H04L 9/40*     (2022.01)
*H04L 67/12*    (2022.01)

(52) U.S. Cl.
CPC ...... *B61L 15/0072* (2013.01); *H04L 63/1416* (2013.01); *H04L 63/1425* (2013.01); *H04L 63/1458* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 2015/0341380 A1* | 11/2015 | Heo ..................... | H04L 63/1458 726/22 |
| 2017/0149820 A1* | 5/2017 | Ruvio ..................... | G06N 20/00 |
| 2018/0123703 A1* | 5/2018 | Xu ........................ | H04L 63/0227 |

FOREIGN PATENT DOCUMENTS

| | | |
|---|---|---|
| CN | 103888438 A | 6/2014 |
| CN | 105791071 A | 7/2016 |

(Continued)

OTHER PUBLICATIONS

International Search Report issued for International Patent Application No. PCT/CN2020/118624, Date of mailing: Mar. 10, 2021, 8 pages including English translation.

*Primary Examiner* — Philip J Chea
*Assistant Examiner* — Bin Qing Zheng
(74) *Attorney, Agent, or Firm* — HSML P.C.

(57) ABSTRACT

The invention relates to an information security protection method and apparatus, and a computer-readable storage medium. The information security protection method comprises the steps of: allocating a train control and monitoring system to an intranet region, and performing region boundary security protection on the train control and monitoring system; performing communication network security pro- (Continued)

tection on the train control and monitoring system; and performing terminal device security protection on the train control and monitoring system. The invention deeply integrates an application service of a train control and monitoring system, and defence-in-depth is performed on the train control and monitoring system from a plurality of dimensions such as region boundary security, communication network security and terminal device security, such that attacks initiated from an intranet and an extranet of the system can be effectively handled, and thus, the information security protection capability of the train control and monitoring system is improved.

18 Claims, 4 Drawing Sheets

(56) References Cited

FOREIGN PATENT DOCUMENTS

| | | | | |
|---|---|---|---|---|
| CN | 107426219 A | * | 12/2017 | ............. H04L 63/02 |
| CN | 108040058 A | * | 5/2018 | ......... H04L 63/0442 |
| CN | 108965320 A | * | 12/2018 | ......... H04L 63/0281 |
| CN | 109347783 A | * | 2/2019 | ............. H04L 63/02 |
| CN | 109768952 A | * | 5/2019 | ............. H04L 29/06 |
| CN | 110532753 A | * | 12/2019 | ............. G06F 21/33 |
| CN | 209870404 U | | 12/2019 | |
| CN | 110758485 A | | 2/2020 | |
| CN | 110901700 A | | 3/2020 | |
| CN | 111071297 A | | 4/2020 | |
| CN | 111181829 A | | 5/2020 | |
| JP | 6271094 B1 | | 1/2018 | |

* cited by examiner

INFORMATION SECURITY PROTECTION METHOD AND APPARATUS

TECHNICAL FIELD

The invention relates to a network security technology of a rail transit train, in particular relates to an information security protection method based on Ethernet technology, and an information security protection apparatus for implementing the method.

BACKGROUND

With the Ethernet of the train control and monitoring system (TCMS), and the increase of the interconnection with the external system, the original "intranet mode+ management system" information security protection technology of the rail train is no longer enough to defend against malicious network attacks.

Subsequently, the information security risk of train control and monitoring system also becomes more and more prominent. Once the train control and monitoring system is invaded, the train may not be started and the machine may be broken in case of light cases; The serious one may cause train traffic accidents. Therefore, it is of great significance to carry out information security protection for rail transit trains.

At present, the research on the information security protection of train control and monitoring system is still in the initial stage, most of the actual operating systems only use firewall to carry out simple isolation protection, almost does not involve any security protection of train control and monitoring system business, it is difficult to cope with the endless attacks.

In order to solve the information security protection problem of train control and monitoring system, the invention provides an information security protection method, an information security protection apparatus, and a computer-readable storage medium, which can deeply combine the in-depth defense system of the train control and monitoring system application service, carry out information security protection for train control and monitoring system from a plurality of dimensions such as region boundary security, communication network security and terminal device security.

SUMMARY OF INVENTION

A brief overview of one or more aspects is given below to provide a basic understanding of these aspects. This overview is not an exhaustive overview of all aspects envisaged, nor is it intended to identify the key or decisive elements in all aspects nor attempt to define the scope of any or all aspects. Its only purpose is to present some concepts of one or more aspects in a simplified form so as to give a more detailed description of the order later.

In order to solve the information security protection problem of train control and monitoring system, the invention provides an information security protection method, an information security protection apparatus, and a computer-readable storage medium, which can deeply combine the in-depth defense system of the train control and monitoring system application service, carry out information security protection for train control and monitoring system from a plurality of dimensions such as region boundary security, communication network security and terminal device security.

The above information security protection method provided by the invention comprises the steps of: allocating a train control and monitoring system to an intranet region, and performing region boundary security protection on the train control and monitoring system; performing communication network security protection on the train control and monitoring system; and performing terminal device security protection on the train control and monitoring system.

Preferably, in some embodiments of the invention, the performing the region boundary security protection may comprises allocating a control network of a train into the intranet region and an information network of the train into the extranet region, wherein the control network includes the train control and monitoring system; and deploying a safety protection device at a regional boundary of the intranet region and the extranet region to prevent external attacks from penetrating into the train control and monitoring system.

Preferably, in some embodiments of the invention, the information network of the train may further includes wireless transmission device and passenger information system.

Preferably, in some embodiments of the invention, the safety protection device further include a firewall module, a safety monitoring module and a safety response module, wherein the firewall module is suitable for configuring protection strategy according to a communication object of the train control and monitoring system; the safety monitoring module is suitable for identifying network attacks, monitoring abnormal communication behaviors, performing threshold value check on transmission control signals between the train control and monitoring system and the passenger service system, and generating corresponding warning information according to the network attacks, abnormal communication behaviors or abnormal transmission control signals; the safety response module is suitable for discarding the data packet that generates the warning information to prevent the external attack.

Preferably, in some embodiments of the invention, the configuring the protection strategy according to the communication object of the train control and monitoring system further comprises to adapt for the communication object of the train control and monitoring system being the wireless transmission device or the passenger information system, configuring a communication whitelist on the firewall module to allow only the datagram in the communication whitelist to pass through, and enabling Anti-DoS attack on a port connecting the firewall module to the wireless transmission device; and to adapt for the communication object of the train control and monitoring system being the wireless transmission device, further establishing a one-way isolated transmission mode to block the data communication actively initiated to the train control and monitoring system through the wireless transmission device.

Optionally, in some embodiments of the invention, the performing the communication network security protection comprises: deploying a distributed safety monitoring device in each intranet sub-area to carry out distributed security analysis, wherein the intranet sub-area is a vehicle level network of a marshal of the train, and the intranet region is the train level network of the train, including multiple intranet sub-areas, the distributed safety monitoring device sends alarm information to a centralized safety monitoring device in response to the abnormal detection; and deploying the centralized safety monitoring device in the train-level network to analyze the application service security of the train control and monitoring system, wherein the centralized safety monitoring device is suitable for carrying out a unified safety alarm according to the abnormal information detected by itself and the alarm information sent by the distributed safety monitoring device.

Preferably, in some embodiments of the invention, the performing the distributed security analysis further comprises extracting network communication features separately for different communication periods; counting the network communication features of each communication period to establish a communication model of a network layer; according to the characteristics of the communication model in each communication period, determining upper and lower thresholds of the communication model; collecting the messages in each communication period during the operation of the train control and monitoring system in real time to extract relevant features and establish an operation model; and sending the alarm information in response to the operation model exceeding the upper and lower thresholds.

Preferably, in some embodiments of the invention, the steps of collecting the messages in real time and establishing the operation model may further include: grouping each message according to the source address of the message, wherein the transmission period of each group of the messages is the same; And establish the operation model within each message group.

Optionally, in some embodiments of the invention, the performing the distributed security analysis further comprises: establishing a communication finite state machine according to a communication service; taking the communication finite state machine of a train under normal operation condition as a safety baseline, and matching it with a communication finite state machine of a train to be detected in real time operation; sending the alarm information in response to an unsuccessful match.

Preferably, in some embodiments of the invention, the analyzing the application service safety of the train control and monitoring system further comprising checking whether gating instructions, traction/brake control instructions, and directional signals transmitted to each carriage are consistent;

according to the safety baseline, checking whether a running speed of the train is within current control range, and checking whether a speed control command is within an allowable range; analyzing whether a control logic transmitted in the intranet region conforms to a control specification of the train under current operation condition, wherein, the control logic includes traction brake control, emergency brake, door control, driver's room control, air conditioning control and traction blockade; and extracting network traffic features of the intranet region and match them with a attack model library to identify network attacks, wherein, the attack model library includes the network traffic features of common attack behaviors.

Optionally, in some embodiments of the invention, the distributed safety monitoring device could obtain network communication data from the corresponding intranet sub-area by mirroring for bypass analysis, and/or the centralized safety monitoring device could obtain network communication data from the intranet region by mirroring for bypass analysis.

Optionally, in some embodiments of the invention, the performing the terminal device security protection comprises designing a security communication whitelist verification thread based on an original service process built into the terminal device to restrict the communication of a terminal device that is not in the security communication whitelist; performing integrity check on communication between non-critical terminal devices; performing encryption check and integrity check on communication between critical terminal devices; and performing a safety baseline analysis of the application layer data to check whether control instructions are compliant, and check whether a train status operation curve is abnormal.

Preferably, in some embodiments of the invention, the critical terminal device may include a central control unit, a brake control unit, and a traction control unit.

Optionally, in some embodiments of the invention, the steps of performing the terminal device security protection may also include: using an independent security process in the terminal device to perform feature analysis and anomaly analysis based on the log information and alarm information of the terminal device.

Preferably, in some embodiments of the invention, the steps of performing the feature analysis may further include: checking whether the accessed content of the terminal device is compliant; checking whether the operation of the terminal device is normal; checking whether malicious behaviors of port scanning exist; checking whether brute-force cracking of access authentication occurs; and matching the alarm information generated by the terminal device with the attack feature library to determine whether the terminal device is under network attack.

Optionally, in some embodiments of the invention, the steps of performing the anomaly analysis may further include: extracting the feature behaviors of network traffic from the historical log information of the terminal device to establish a safety baseline for normal operation; and matching the current network traffic log with the safety baseline for the normal operation to determine whether there is an anomaly in the network layer of the terminal device.

Preferably, in some embodiments of the invention, the steps of performing the anomaly analysis may also include: extracting the operation state data of the train from the historical log information to form a historical data curve; establishing the train operation state model according to the historical data curve; and matching the current train operation status log with the train operation status model to judge whether there is an anomaly in the application layer of the terminal device.

According to another aspect of the invention, an information security protection apparatus is also provided herein.

The information security protection apparatus provided by the invention comprises a memory and a processor. The processor is connected to the memory, and configured to implement the information security protection method provided by any of the above embodiments, so as to deeply integrate an application service of a train control and monitoring system, and defence-in-depth is performed on the train control and monitoring system from a plurality of dimensions such as region boundary security, communication network security and terminal device security.

According to another aspect of the invention, a computer-readable storage medium is also provided herein.

The computer-readable storage medium provided by the invention has computer instructions stored thereon. When the computer instructions are executed by the processor, the information security protection method provided by any of the above embodiments can be implemented, so as to deeply integrate an application service of a train control and monitoring system, and defence-in-depth is performed on the train control and monitoring system from a plurality of dimensions such as region boundary security, communication network security and terminal device security.

BRIEF DESCRIPTION OF THE DRAWINGS

After reading the detailed description of the disclosed embodiments in conjunction with the drawings below the above characteristics and advantages of the invention can be better understood. In the drawings, the components are not necessarily drawn to scale, and components with similar related characteristics or features may have the same or similar references.

DETAILED DESCRIPTION

The implementation mode of the invention is described in the following specific embodiments, those skilled in the art can easily understand other advantages and effects of the invention from the contents disclosed in the specification. Although the description of the invention will be introduced together with the preferred embodiments, it does not mean that the characteristics of the invention are limited to the embodiments. On the contrary, the purpose of introducing the invention in combination with the embodiments is to cover other options or modifications that may be extended based on the claims of the invention. In order to provide a deep understanding of the invention, the following description will contain many specific details. The invention could also be implemented without the use of these details. In addition, in order to avoid confusion or ambiguity in the focus of the invention, some specific details will be omitted in the description.

In the description of the invention, it shall be noted that, unless otherwise expressly specified and defined, the terms "installation", "connection" and "joint" shall be understood in a broad sense, for example, they can be fixed connection, removable connection or integrated connection; It can be mechanical joint, can also be electrical connection; It can be directly connected, can also be indirectly connected through an intermediate media, it can be connected within two elements. For ordinary technicians in the art, the specific meaning of the above terms in the invention can be understood in specific cases.

As mentioned above, the research on the information security protection of train control and monitoring system is still in the initial stage at present, most of the actual operating system only uses the firewall to carry out simple isolation protection, almost does not involve any security protection of train control and monitoring system service, it is difficult to cope with the endless attacks.

In order to solve the information security protection problem of train control and monitoring system, the invention provides an information security protection method, an information security protection apparatus, and a computer-readable storage medium, which can deeply combine the in-depth defense system of the train control and monitoring system application service, carry out information security protection for train control and monitoring system from a plurality of dimensions such as region boundary security, communication network security and terminal device security.

Figure 1:
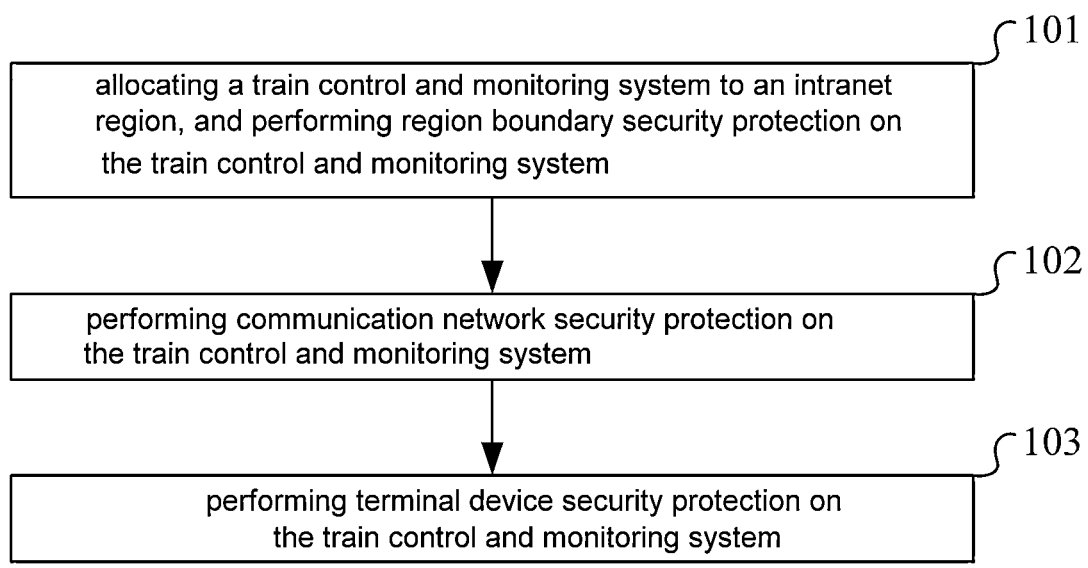
FIG. 1 shows a flow diagram of an information security protection method provided according to one aspect of the invention.

Please refer to FIG. 1, which shows a flow diagram of an information security protection method provided according to one aspect of the invention.

As shown in FIG. 1, the above information security protection method provided by the invention may include steps:

101: Allocating a train control and monitoring system to an intranet region, and performing region boundary security protection on the train control and monitoring system.

The above region boundary security protection aims to prevent network attacks from penetrating from the extranet region to the intranet region where the Train Control and Monitoring System (TCMS) is located, and prevent network attacks from spreading among different regions of intranet.

Figure 2:
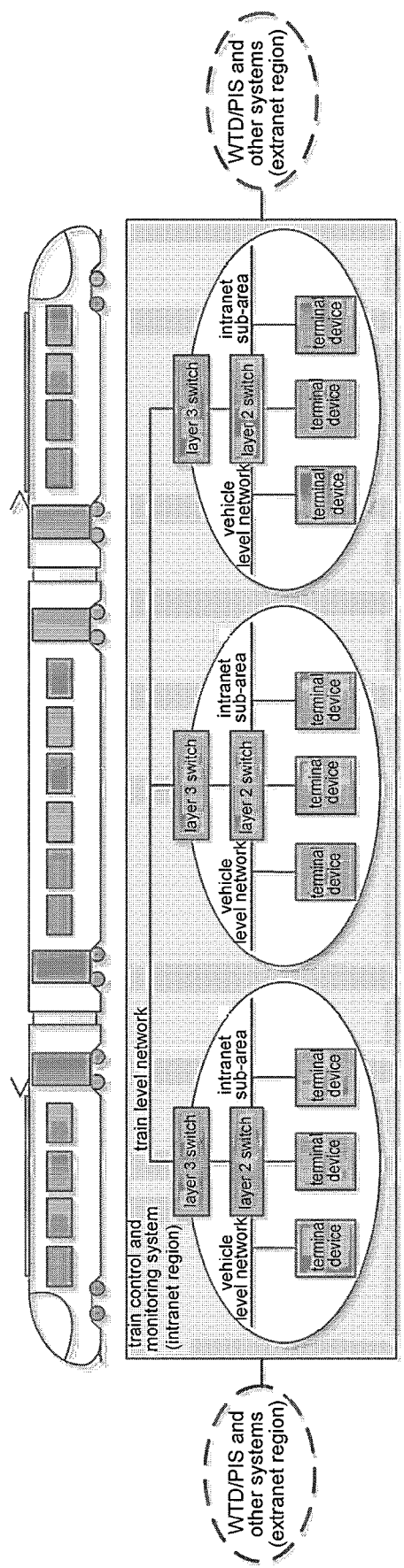
FIG. 2 shows a schematic diagram of allocating a network region according to some embodiments of the invention.

Please refer to FIG. 2, which shows a diagram of allocating a network region according to some embodiments of the invention.

As shown in FIG. 2, in some embodiments of the invention, the on-board network of the rail transit train can be divided into regions according to the business features of the rail transit train and according to the principle of separation of control network and information network, so as to prevent the penetration of network attacks from the extranet region to the intranet region. Specifically, the invention can define the network region of the train control and monitoring system (TCMS) belonging to the control network as the intranet region, and the Wireless Transmission Device (WTD), Passenger Information System (PIS) and other systems belonging to the information network as the extranet area.

After that, the invention can deploy safety protection device at the boundary of the extranet region to prevent external attacks from penetrating into the train control and monitoring system. The boundary of the extranet region refers to location where the information of train control and monitoring system and other systems such as the wireless transmission/passenger information system interacts.

Figure 3:
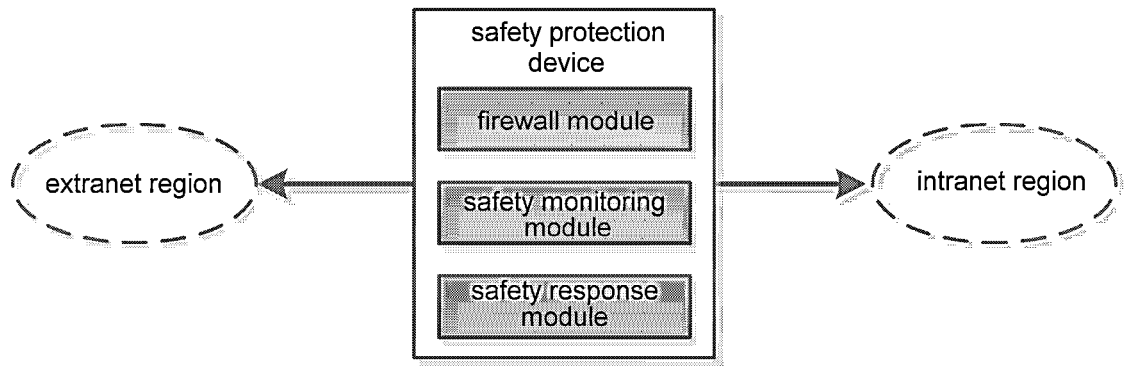
FIG. 3 shows a schematic diagram of security protection at the extranet region boundary according to some embodiments of the invention.

Please refer to FIG. 3, which shows a schematic diagram of security protection at the boundary of the extranet region according to some embodiments of the invention.

As shown in FIG. 3, in some embodiments of the invention, the safety protection device may include a firewall module, a safety monitoring module and a safety response module.

Because the communication service between train control and monitoring system and wireless transmission device is different from the communication service between train control and monitoring system and passenger information system, it is suitable for configuring different protection strategies for the firewall according to the communication object of train control and monitoring system.

Specifically, in some embodiments, the communication service between the train control and monitoring system and the wireless transmission device is mainly one-way transmission, that is, the train control and monitoring system only needs to send the train operation status data to the wireless transmission device. Therefore, the firewall protection strategy can be configured as follows:
  (a) Define a communication whitelist of seven-tuples: source/destination MAC address, source/destination IP address, source/destination port number, and network layer protocol, restrict the source/destination address, source/destination port, and communication protocol of the data sent by the train control and monitoring system to the wireless transmission device, and only allow the datagram in the communication whitelist to pass through;
  (b) Establish an one-way isolation transmission mode, only allow the one-way data transmission from the train control and monitoring system to the wireless transmission device, and block any data communication actively initiated by the wireless transmission device to the train control and monitoring system.
  (c) Enable anti denial of service attacks, anti source address spoofing attacks, anti ICMP Flood attacks, anti Smurf attacks, anti LAND attacks, anti Winnuke attacks, and anti SYN/FIN attacks and the like at the port connecting the firewall to the wireless transmission device, to prevent others from launching network attacks on the intranet region of the train control and monitoring system through the extranet region of the wireless transmission device.

In other embodiments, the communication service between the train control and monitoring system and the passenger information system is two-way transmission, including the service of sending public network video and control signal from the passenger information system to the train control and monitoring system, and the service of sending control signal from the train control and monitoring system to the passenger information system. Therefore, the firewall protection strategy can be configured as follows:
  (a) Allow two-way data transmission between the train control and monitoring system and the passenger information system, but need to define the communication whitelist based on the seven-tuples (source/destination MAC address, source/destination IP address, source/destination port number, network layer protocol), and only allow the datagram in the communication whitelist to pass through.
  (b) Enable anti denial of service attacks, anti-source address spoofing attacks, anti ICMP Flood attacks, anti Smurf attacks, anti-LAND attacks, anti Winnuke attacks, and anti SYN/FIN attacks and the like on the port connecting the firewall and the passenger information system, to prevent others from launching network attacks on the intranet region of the train control and monitoring system through the extranet region of the passenger information system.

In some embodiments of the invention, the protection strategy of the above security monitoring module shown in FIG. 3 can be configured as:
  (a) Firstly, for common attack behavior, including DDoS attacks, man-in-the-middle attacks, port scanning, brute force cracking, Trojan backdoor and other malicious code intrusion, establish the corresponding model library; then, when the system is running, the corresponding network traffic features are extracted and matched with the attack library for attack identification.
  (b) According to the communication whitelist, traffic statistics and records are carried out for each group of communication links, and corresponding communication behavior models are established based on statistics, state machine, machine learning and other technologies; then, when the system is running, the real-time communication message is matched with the established behavior model to find the abnormal communication behavior.
  (c) For the transmission control signal between TCMS and PIS, define a safety baseline and check the threshold values in real time.
  (d) Generate warning message based on the detected attacks or exceptions.

In some embodiments of the invention, the above safety response module shown in FIG. 3 is suitable for discarding the packets that generate warning messages to prevent attacks from the extranet region from penetrating the intranet.

As shown in FIG. 2, in some embodiments of the invention, the train control and monitoring system can include vehicle level network and train level network. The above vehicle level network is a marshalling network of one vehicle marshalling. Multiple terminal devices can be set in the marshalling network. Each terminal device in the same marshalling network has the network address of the same network segment, and communicates through the layer 2 switch in the marshalling network.

The above train level network is the backbone network of the whole train and has the network address of different network segments from the marshalling network of each vehicle marshal. In some embodiments, the backbone network may comprise a plurality of layer 3 switches corresponding to each train marshalling respectively. The layer 2 switch of each marshalling network can connect to the communication ports of the corresponding layer 3 switch respectively, thus adopting layer 3 switching for communication.

Based on the topology structure of the train control and monitoring system, the invention can further allocate the intranet region where the train control and monitoring system is located into different intranet sub-areas according to the communication mode of the network, among which, each sub-area is an independent marshalling network. After that, the invention can use the means of communication network security protection to prevent the spread of network attacks between different regions of the intranet.

As shown in FIG. 1, the above information security protection method provided by the invention may also include steps:

102: Performing communication network security protection on the train control and monitoring system.

The above communication network security protection aims to ensure the normal operation of the communication link of the train control and monitoring system and prevent the communication data from being tampered with. In some embodiments of the invention, distributed safety monitoring device can be deployed in each intranet sub-area for distributed security analysis, and centralized safety monitoring device can be deployed between intranet sub-areas to analyze the application service safety of the train control and monitoring system.

Figure 4:
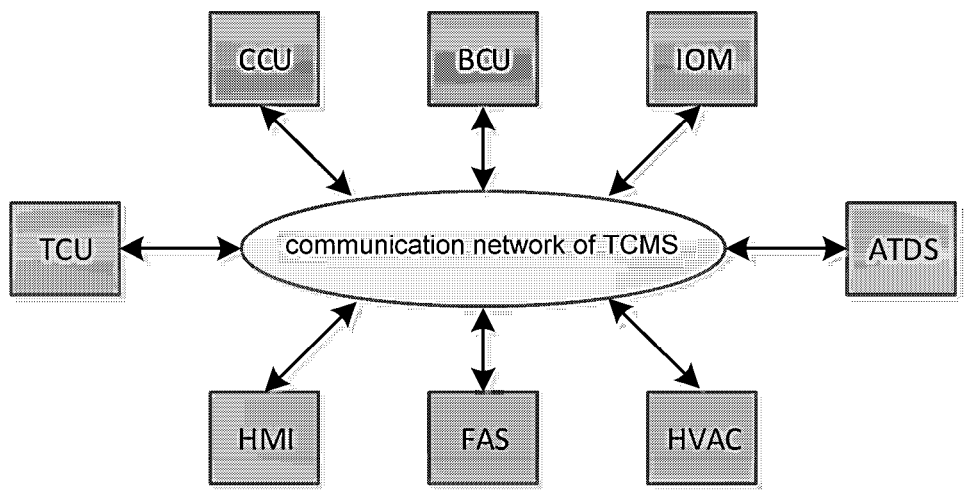
FIG. 4 shows a communication network topology diagram of a train control and monitoring system according to some embodiments of the invention.
Figure 5:
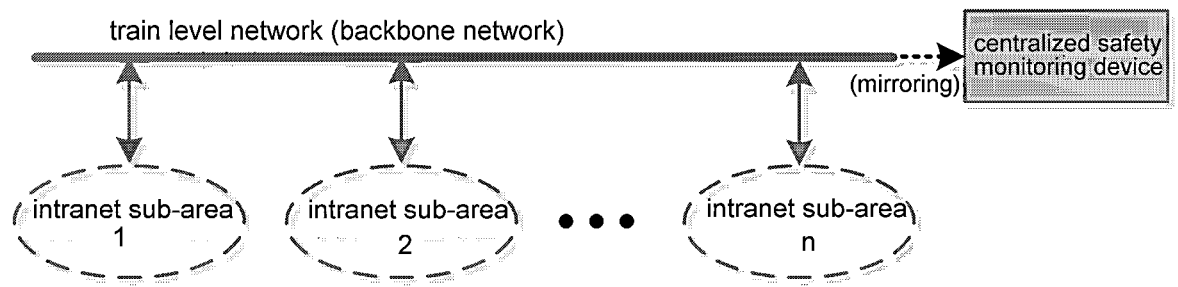
FIG. 5 shows a schematic diagram of deploying a centralized safety monitoring device between intranet sub-areas according to some embodiments of the invention.

Please refer to FIG. 4 and FIG. 5, FIG. 4 shows a topology diagram of the communication network of the train control and monitoring system provided according to some embodiments of the invention, and FIG. 5 shows a diagram of the deployment of centralized safety monitoring device between intranet sub-areas provided according to some embodiments of the invention.

As shown in FIG. 4, the communication network of the train control and monitoring system may include a Central Control Unit (CCU), Brake Control Unit (BCU), Input Output Module, IOM), Traction Control Unit (TCU), Human Machine Interface (HMI), Fire Alarm System, FAS) and Heating, Ventilation and Air Conditioning (HVAC), etc. In some preferred embodiments, for the communication network security protection of the train control and monitoring system, the bypass analysis method may be adopted to ensure the real-time communication of the communication network of the train control and monitoring system.

To be specific, the distributed safety monitoring device deployed in each intranet sub-area can obtain the network communication data in the corresponding intranet sub-area through mirroring for security analysis. In some embodiments, distributed safety monitoring devices can analyze the security of communication networks from the network layer and the application layer respectively.

In the aspect of network layer, because the terminal device of train control and monitoring system uses periodic multicast mode to communicate, statistics-based method is adopted for security analysis of network layer. First, the invention can extract the network communication features (including source/destination MAC address, source/destination IP address, source/destination port number, TCP/UDP protocol, application layer protocol type, etc.) within each communication period, and establish the network layer communication model by using statistical techniques (such as information entropy). Then, compare and analyze the characteristics of the network communication models established in different periods, and determine the upper and lower thresholds of the models when the communication network is running normally. After that, the invention can collect the messages within the communication period in real time when the system is running, so as to extract the relevant features and build the model, and compare whether the current model exceeds the upper and lower thresholds allowed during normal operation. If the current model exceeds the allowed upper and lower thresholds, the distributed safety monitoring device will determine that an exception occurred, thereby sending an alarm message to the centralized safety monitoring device.

In some preferred embodiments, it is considered that different devices in the communication network of the train control and monitoring system may have different data transmission period. For example, the CCU sends messages once every 30 ms, FAS and ATDS send messages once every 500 ms, and HVAC send messages once every 200 ms. Therefore, when extracting period features to compare upper and lower threshold values, the invention can preferably divide messages into groups according to the source address of the message. For example, the CCU's are divided into a group separately, the FAS's and ATDS's are divided into a group and the HVAC's are divided into a group according to source address, to collect messages in the communication period by groups. Then, each message group can be modeled and analyzed separately to overcome the problem that different devices send data at different periods.

In the aspect of application layer, within the communication period of each group of devices participating in the communication, the invention can establish the corresponding communication finite state machine according to the communication service. In the communication network of train control and monitoring system, the general communication mode is that the CCU sends the request and other terminal devices respond to the request. In some embodiments, the start node of the communications finite state machine may send a request from the CCU, and the end node may receive a response from the last terminal. Accordingly, the security analysis process based on the communication finite state machine can include: taking the communication finite state machine during normal train operation as the safety baseline; in the detection stage, the communication finite state machine during real-time train operation is matched with the safety baseline. If the match fails, the distributed safety monitoring device determines that an exception has occurred and sends an alarm message to the centralized safety monitoring device.

As shown in FIG. 5, in some embodiments of the invention, the centralized safety monitoring device can be deployed between each intranet sub-area to obtain network communication data from the train-level network in the Intranet region by mirroring, so as to analyze the application service security of the train control and monitoring system. Application service security analysis of train control and monitoring system can include service consistency check, security baseline check, control logic analysis and attack identification.

Specifically, the service consistency check includes but is not limited to checking whether the gating instructions, traction/brake control instructions, direction signals, etc. transmitted to each carriage are consistent. Security baseline check includes but is not limited to checking whether the train is operating at speeds within the current control range, and checking whether speed control commands are within the allowable range. Control logic analysis refers to analysis of whether the control logic transmitted in the communication network conforms to the control specification under the train operation condition. Control logic analysis includes but is not limited to traction brake control, emergency brake, door control, driver's room control, air conditioning control, traction blockade. Attack identification includes establishing the corresponding model library for common attack behavior; then, when the system is running, the corresponding network traffic features are extracted to match with the attack library, so as to identify the attack. Common attacks include but are not limited to DDoS attacks, man-in-the-middle attacks, port scanning, brute force cracking, and Trojan backdoors and other malicious code intrusion.

In some embodiments, the centralized safety monitoring device can generate unified security alarms based on the abnormal information detected by the device itself and the alarm information transmitted by the distributed safety monitoring device.

As shown in FIG. 1, the above information security protection method provided by the invention may also include steps:

103: Performing terminal device security protection on the train control and monitoring system.

The above terminal device security protection aims to prevent the terminal device in the train control and monitoring system from being attacked and infected. In some embodiments, the terminal device security protection method of the train control and monitoring system can be built into each terminal device, and involves the original service process and independent security process of each terminal device.

Specifically, for the original service process of the terminal device, the invention may first design the security communication whitelist check thread. The security communication whitelist may include the communication subject/object, involved ports and services and so on, only specified devices are allowed to communicate. Secondly, the invention can check the integrity of the received application layer data to ensure the correctness of data transmission. In some preferred embodiments, for special application services such as communication between critical terminal devices, the invention can preferably adopt encryption and decryption technology for the communication data involved. The above critical terminal device includes but is not limited to central control unit CCU, brake control unit BCU and traction control unit TCU. Finally, the invention can perform safety baseline analysis on application layer data to check whether the control instruction is compliant and whether the train state operation curve is abnormal.

In some embodiments, the terminal device security protection of train control and monitoring system can be divided into two parts: communication between critical components and communication between non-critical components. As shown in FIG. 4, communication between critical components can include communication between CCU and BCU, between CCU and TCU, between BCU and TCU. Correspondingly, the communication between non-critical components may include other communication modes between each terminal device.

For communication between non-critical components, the invention can adopt integrity check technology to ensure the integrity of communication data. Specifically, the invention can adopt CRC check technology, define the same CRC check table on both sides of the communication; calculate the CRC value of the application data at the sending end and transmit it to the receiving end together with the application data. Then the CRC value of all application data is calculated at the receiving end. If the value is zero, it indicates that the data transmission is correct; if the value is not zero, it indicates that the data transmission is incorrect and the data needs to be retransmitted.

For communication between critical components, the invention can preferably adopt encryption technology to ensure that the communication data is not tampered with and stolen.

Figure 6:
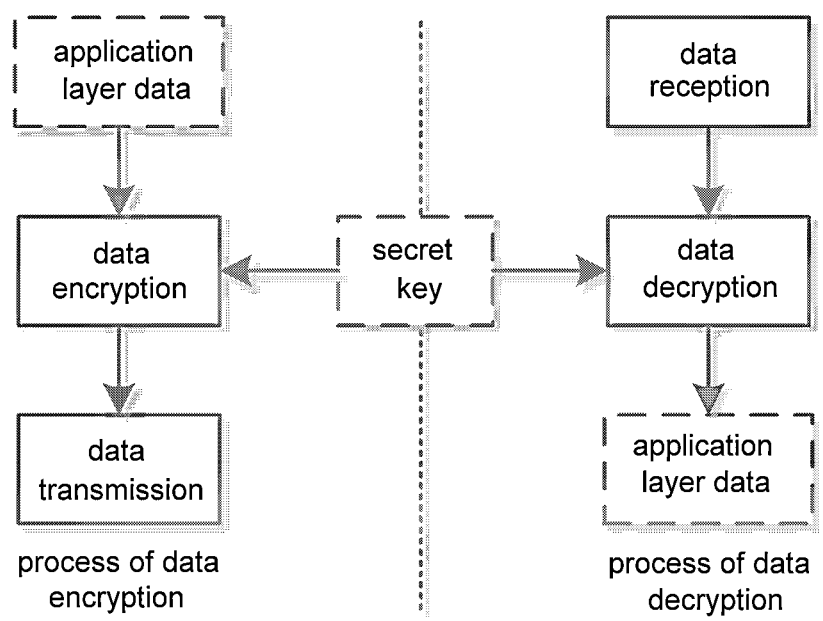
FIG. 6 shows a schematic diagram of the flow for encrypting and decrypting communication data according to some embodiments of the invention.

Please refer to FIG. 6, FIG. 6 shows a schematic diagram of the process for encrypting and decrypting communication data according to some embodiments of the invention.

As shown in FIG. 6, in some preferred embodiments, the invention can first encrypt the application layer data at the encryption end through encryption algorithm and secret key, and then send the encrypted application layer data to the decryption end; after that, the invention can decrypt the received data through the decryption algorithm and the same secret key at the decryption end to restore the sent application layer data. In some embodiments, after having parsed the application layer data, the decryption end can also use the above integrity check technology to verify the correctness of data transmission.

In some embodiments of the invention, an independent security process can also be used in each terminal device to carry out feature analysis and anomaly analysis according to the log information and alarm information of the terminal device, so as to perform the terminal device security protection. The independent security process can be carried out by combining feature analysis and exception analysis.

Specifically, feature analysis can first check whether the accessed content of the terminal device is compliant, whether the operation on the device is normal, whether there are malicious behaviors such as port scanning, and whether brute-force cracking of access authentication occurs. Secondly, the invention can establish the attack feature library and match the alarm information generated by the terminal device with the attack feature library, so as to analyze whether the alarm information generated by the terminal device contains the alarm behavior matching the attack feature library, so as to judge whether the terminal device is attacked by the network.

Anomaly analysis can involve two layers: the network layer and the application layer. For the anomaly analysis of the network layer, firstly, the corresponding feature behavior of network traffic can be extracted from the historical log files of terminal devices, and the statistics, machine learning and other technologies may be used to establish a security baseline during normal operation. Then, during the analysis phase, the current network traffic logs may be matched with the security baseline during normal operation to analyze whether the current network traffic logs are abnormal.

For anomaly analysis at the application layer, firstly, the status data of train operation can be extracted from historical log files to form historical data curves. Then, the statistics, machine learning and other technologies may be used to establish the train operation state model. Then, in the analysis phase, the current train operation status log can be matched with the train operation status model to analyze whether the current recorded train operation status log is abnormal.

In summary, by proposing a three-level information security protection architecture system covering region boundary, communication network and terminal device, the invention can provide information security protection for train control and monitoring system from multiple dimensions such as transmission path and communication message. Based on the deep combination of the features of system architecture and the requirements of application service, the invention can prevent the penetration of network attacks from the extranet region to the intranet region, as well as the propagation between different regions of the intranet through the region boundary security protection. On the basis of decoupling the critical and non-critical services of the train control and monitoring system, the invention can ensure the normal operation of the communication link of the train control and monitoring system and prevent the tampering of the communication data through the communication network security protection and the terminal device security protection, thus realizing different information security protection of the communication network and terminal device of the train control and monitoring system.

The information security protection method of the rail transit train on-board network control system provided by the invention can, on the basis of deeply combining the structural features and application service of the train control and monitoring system, design a three-level information security protection architecture system covering the security region boundary, security communication network and security terminal device, realizing the deep defense of train control and monitoring system. The invention can not only effectively prevent the attack from penetrating into the intranet of the train control and monitoring system from the extranet, but also effectively prevent the attack from the intranet region of the train control and monitoring system, so as to improve the information security protection ability of the train control and monitoring system. In addition, the security protection method for the communication network and terminal device of the train control and monitoring system proposed by the invention can effectively ensure that the communication data of the train control and monitoring system is not tampered with, and ensure the normal control logic of the train control and monitoring system, so as to provide important support for ensuring the safety of train operation.

Although the above method diagrams are illustrated and described as a series of actions for simplicity of interpretation, it should be understood and appreciated that these methods are not limited by the order of actions because, according to one or more embodiments, some actions may occur in a different order and/or in conjunction with other actions derived from the drawings and descriptions in this article or not depicted and described in this article, but can be understood by those skilled in the art.

According to another aspect of the invention, an information security protection apparatus is also provided.

Figure 7:
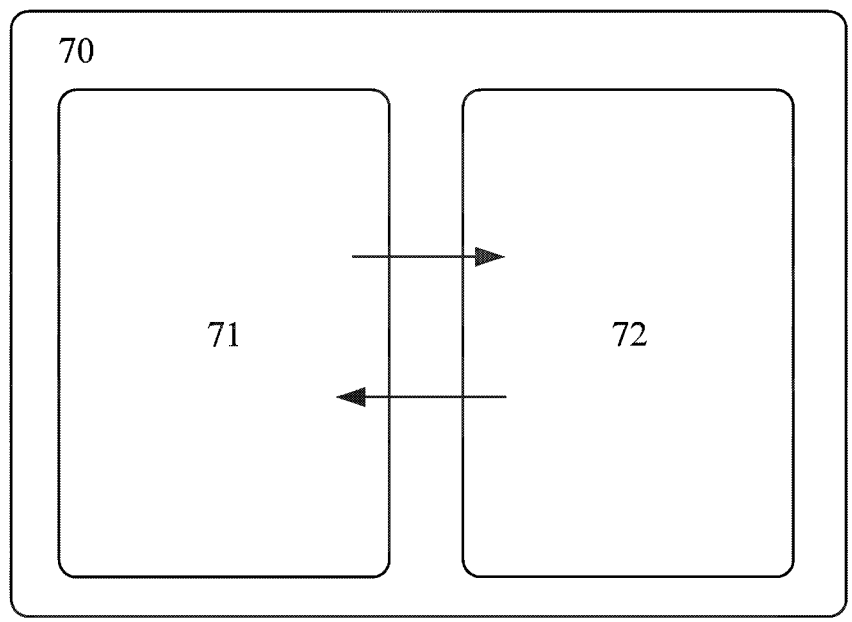
FIG. 7 shows an architectural diagram of an information security protection apparatus according to another aspect of the invention.

Please refer to FIG. 7, FIG. 7 shows an architectural diagram of an information security protection apparatus according to another aspect of the invention.

As shown in FIG. 7, the information security protection apparatus 70 provided by the invention comprises a memory 71 and a processor 72. The processor 72 is connected to the memory 71 and configured to implement the information security protection method provided by any of the above embodiments, so as to deeply combine the in-depth defense system of the train control and monitoring system application service, carry out information security protection for train control and monitoring system from a plurality of dimensions such as region boundary security, communication network security and terminal device security.

According to another aspect of the invention a computer-readable storage medium is also provided.

The computer-readable storage medium provided by the invention has computer instructions stored thereon. When the computer instruction is executed by the processor 72, the information security protection method provided by any of the above embodiments can be implemented, so as to deeply combine the in-depth defense system of the train control and monitoring system application service, carry out information security protection for train control and monitoring system from a plurality of dimensions such as region boundary security, communication network security and terminal device security.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An information security protection method, comprising:
   allocating a train control and monitoring system to an intranet region;
   performing region boundary security protection on the train control and monitoring system;
   performing communication network security protection on the train control and monitoring system; and
   performing terminal device security protection on the train control and monitoring system,
   wherein the performing of the communication network security protection comprises:
      deploying a distributed safety monitoring device in an intranet sub-area to carry out distributed security analysis, wherein
         the intranet sub-area is an independent marshalling vehicle level network of the train, and
         the intranet region is a train level network of the train, including multiple intranet sub-areas, and
         the distributed safety monitoring device is configured to send alarm information to a centralized safety monitoring device in response to a detected abnormality; and
      deploying the centralized safety monitoring device in the train level network to analyze application service security of the train control and monitoring system, wherein the centralized safety monitoring device is configured to execute a unified safety alarm according to abnormal information detected by the centralized safety monitoring device and the alarm information sent by the distributed safety monitoring device.

2. The information security protection method of claim 1, wherein the performing of the region boundary security protection comprises:
   allocating a control network of the train into the intranet region and an information network of the train into an extranet region,
      wherein the control network includes the train control and monitoring system; and
   deploying a safety protection device at a regional boundary of the intranet region and the extranet region to prevent external attacks from penetrating into the train control and monitoring system.

3. The information security protection method of claim 2, wherein the information network of the train comprises:
   a wireless transmission device, and
   a passenger information system.

4. The information security protection method of claim 3, wherein the safety protection device comprises:
   a firewall module;
   a safety monitoring module; and
   a safety response module, wherein
      the firewall module is configured to configure a protection strategy according to a communication object of the train control and monitoring system;
      the safety monitoring module is configured to:
         identify network attacks,
         monitor abnormal communication behaviors,
         perform threshold value check on transmission control signals between the train control and monitoring system and the passenger service system, and
         generate corresponding warning information according to the identified network attacks, abnormal communication behaviors or abnormal transmission control signals; and
      the safety response module is configured to discard the data packet that generates the warning information to prevent an external attack.

5. The information security protection method of claim 4, wherein the configuring of the protection strategy according to the communication object of the train control and monitoring system comprises:
   to adapt for the communication object of the train control and monitoring system being the wireless transmission device or the passenger information system:
      configuring a communication whitelist on the firewall module to allow only the datagram in the communication whitelist to pass through, and
      enabling Anti-DOS attack on a port connecting the firewall module to the wireless transmission device; and
   to adapt for the communication object of the train control and monitoring system being the wireless transmission device:
      establishing a one-way isolated transmission mode to block the data communication actively initiated to the train control and monitoring system through the wireless transmission device.

6. The information security protection method of claim 1, wherein the performing of the distributed security analysis comprises:
   extracting network communication features separately for different communication periods;
   counting the extracted network communication features of each of the different communication period to establish a communication model of a network layer;
   according to characteristics of the communication model established in each communication period, determining upper and lower thresholds of each of the communication models;
   collecting the messages in each communication period during operation of the train control and monitoring system in real time to extract relevant features and establish an operation model; and
   sending the alarm information in response to the operation model exceeding the upper and lower thresholds.

7. The information security protection method of claim 6, wherein the collecting of the messages in real time and establishing of the operation model comprises:
   grouping each message according to a source address of the message,
      wherein a transmission period of each group of the messages is equal; and
   establish the operation model within each message group.

8. The information security protection method of claim 6, wherein the performing of the distributed security analysis comprises:
   establishing a communication finite state machine according to a communication service;
   matching the established communication finite state machine of a train under normal operation condition as a safety baseline with a communication finite state machine of a train to be detected in real time operation;
   sending the alarm information in response to an unsuccessful match.

9. The information security protection method of claim 8, wherein the analyzing the application service safety of the train control and monitoring system further comprises:

checking whether gating instructions, traction/brake control instructions, and directional signals transmitted to each carriage are consistent;

according to the safety baseline:
- checking whether a running speed of the train is within current control range, and
- checking whether a speed control command is within an allowable range;

analyzing whether a control logic transmitted in the intranet region conforms to a control specification of the train under current operation condition, wherein
- the control logic includes traction brake control, emergency brake, door control, driver's room control, air conditioning control and traction blockade; and extracting network traffic features of the intranet region and matching the extracted network traffic features with an attack model library to identify network attacks, wherein
- the attack model library includes the network traffic features of common attack behaviors.

10. The information security protection method of claim 1, wherein
- the distributed safety monitoring device is configured to obtain network communication data from the corresponding intranet sub-area by mirroring for bypass analysis, and/or
- the centralized safety monitoring device is configured to obtain network communication data from the intranet region by mirroring for bypass analysis.

11. The information security protection method of claim 1, wherein the performing of the terminal device security protection comprises:
- designing a security communication whitelist verification thread based on an original service process built into the terminal device to restrict the communication of a terminal device that is not in the security communication whitelist;
- performing integrity check on communication between non-critical terminal devices;
- performing encryption check and integrity check on communication between critical terminal devices; and
- performing a safety baseline analysis of the application layer data to check whether control instructions are compliant, and check whether a train status operation curve is abnormal.

12. The information security protection method of claim 11, wherein each of the critical terminal devices comprises a central control unit, a brake control unit, and a traction control unit.

13. The information security protection method of claim 11, wherein the performing of the terminal device security protection further comprises:

performing feature analysis and anomaly analysis based on log information and alarm information of the terminal device using an independent security process in the terminal device.

14. The information security protection method of claim 13, wherein the performing the feature analysis further comprises:
- checking whether accessed content of the terminal device is compliant;
- checking whether the operation of the terminal device is normal;
- checking whether malicious behaviors of port scanning exist;
- checking whether brute-force cracking of access authentication occurs; and
- matching alarm information generated by the terminal device with an attack feature library to determine whether the terminal device is under network attack.

15. The information security protection method of claim 13, wherein the performing of the anomaly analysis further comprises:
- extracting feature behaviors of network traffic from historical log information of the terminal device to establish a safety baseline for normal operation; and
- matching current network traffic log with the safety baseline for the normal operation to determine whether there is an anomaly in the network layer of the terminal device.

16. The information security protection method of claim 15, wherein the performing of the anomaly analysis further comprises:
- extracting operation state data of the train from the historical log information to form a historical data curve;
- establishing a train operation state model according to the historical data curve; and
- matching current train operation status log with the train operation state model to judge whether there is an anomaly in the application layer of the terminal device.

17. An information security protection apparatus, comprising:
- a memory; and
- a processor,
  - the processor being connected with the memory and configured to implement the information security protection method of claim 1.

18. A non-transitory computer-readable storage medium, having computer instructions stored thereon, wherein the information security protection method of claim 1 can be implemented when the computer instructions are executed by the processor.

* * * * *